United States Patent
Longuemare et al.

(10) Patent No.: US 11,866,104 B2
(45) Date of Patent: Jan. 9, 2024

(54) POWER PACK FOR ELECTRIC POWER STEERING SYSTEM

(71) Applicant: Steering Solutions IP Holding Corporation, Saginaw, MI (US)

(72) Inventors: Pierre C. Longuemare, Paris (FR); Kun Yang, Cc (CN); Yang Zhang, Jiangsu (CN); Sean Syc Shen, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 234 days.

(21) Appl. No.: 17/235,570

(22) Filed: Apr. 20, 2021

(65) Prior Publication Data

US 2022/0306184 A1    Sep. 29, 2022

(30) Foreign Application Priority Data

Mar. 25, 2021    (CN) .................. 202110320917.X

(51) Int. Cl.
| | |
|---|---|
| *H02K 11/40* | (2016.01) |
| *B62D 5/04* | (2006.01) |
| *H02K 5/22* | (2006.01) |
| *H02K 11/30* | (2016.01) |
| *H02K 9/22* | (2006.01) |

(52) U.S. Cl.
CPC ............ *B62D 5/0403* (2013.01); *H02K 5/225* (2013.01); *H02K 9/227* (2021.01); *H02K 11/30* (2016.01); *H02K 11/40* (2016.01); *H02K 2211/03* (2013.01)

(58) Field of Classification Search
CPC ..... H02K 11/30; H02K 11/40; H02K 2211/03
See application file for complete search history.

(56) References Cited

U.S. PATENT DOCUMENTS

2012/0201702 A1*    8/2012    Talaski .................. H02K 5/148
                                                            417/423.7

FOREIGN PATENT DOCUMENTS

| DE | 102013204791 A1 | 9/2013 |
|---|---|---|
| DE | 112014004327 T5 | 6/2016 |
| WO | 20190159406 A1 | 8/2019 |

OTHER PUBLICATIONS

Office Action regarding corresponding DE App. No. 10 2021 108 902.6; dated Feb. 7, 2022.

\* cited by examiner

*Primary Examiner* — Ramon M Barrera
(74) *Attorney, Agent, or Firm* — Dickinson Wright PLLC

(57) ABSTRACT

A manual power pack assembly for an electric power steering (EPS) system includes a motor housing at least partially enclosing a motor and having an outer diameter. The manual power pack assembly also includes a connector plate formed of a material comprising plastic, the connector plate having a first side, a second side, and a cylinder extending from the first side. The manual power pack further includes a metal ring disposed on an inner diameter of the cylinder and in contact with the outer diameter of the motor housing.

11 Claims, 4 Drawing Sheets

POWER PACK FOR ELECTRIC POWER STEERING SYSTEM

CROSS-REFERENCE TO RELATED APPLICATION

The present application claims priority to the Chinese patent application No. 202110320917.X, filed on Mar. 25, 2021, which is incorporated herein by reference in its entirety.

FIELD OF THE INVENTION

The disclosure herein relates to an electric power steering system and, more particularly, to a power pack assembly for such systems.

BACKGROUND

A vehicle often includes an electric power steering (EPS) system to aid an operator of the vehicle in steering the vehicle. The EPS system uses sensors to detect a position and torque of a steering column and supply a signal to an electric motor to cause the electric motor to supply additional torque to assist the operator in steering the vehicle. The additional torque supplied to assist the operator in steering the vehicle can vary based on vehicle characteristics, driving conditions, road conditions, and the like.

The EPS system can utilize a controller to receive signals from sensors, analyze the signals, and control the electric motor. The controller board is connected to a motor housing via a tray, which may be referred to herein as a connector plate. The connector plate is typically formed of metal, such as a cast aluminum part. The metal connector plate is screwed to studs protruding from the motor housing and the controller board is screwed to the metal connector plate. The nuts required for the aforementioned coupling process are complex to handle and lead to increased overall shipping and assembly processes. However, the metal provides certain advantages and assists with grounding, conductivity, and heat transfer, for example.

SUMMARY OF THE DISCLOSURE

According to one aspect of the disclosure, a manual power pack assembly for an electric power steering (EPS) system is provided. The manual power pack assembly includes a motor housing at least partially enclosing a motor and having an outer diameter. The manual power pack assembly also includes a connector plate formed of a material comprising plastic, the connector plate having a first side, a second side, and a cylinder extending from the first side. The manual power pack further includes a metal ring disposed on an inner diameter of the cylinder and in contact with the outer diameter of the motor housing.

According to another aspect of the disclosure, a connector plate for a manual power pack assembly is provided. The connector plate includes a first side. The connector plate also includes a second side. The connector plate further includes a cylinder extending from the first side, wherein the connector plate is formed of a material comprising plastic. The connector plate yet further includes a metal ring disposed on an inner diameter of the cylinder. The connector plate also includes a plurality of pins extending from the second side, the plurality of pins configured to be inserted into a controller board.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring to the Figures, without limiting same, embodiments of the disclosure are described herein. In particular, a manual power pack assembly for an electric power steering (EPS) system are disclosed herein. Although illustrated and described in connection with a column EPS system, it is to be appreciated that other types of EPS systems (e.g., rack) may benefit from the embodiments disclosed herein. Furthermore, the illustrated steering system has a mechanical connection from the steering input device to the steering gear, but it is to be appreciated that steer-by-wire systems may also benefit from the disclosed embodiments. Therefore, the illustrated embodiment is not limiting of the particular application that the manual power pack assembly may be utilized with.

Figure 1:
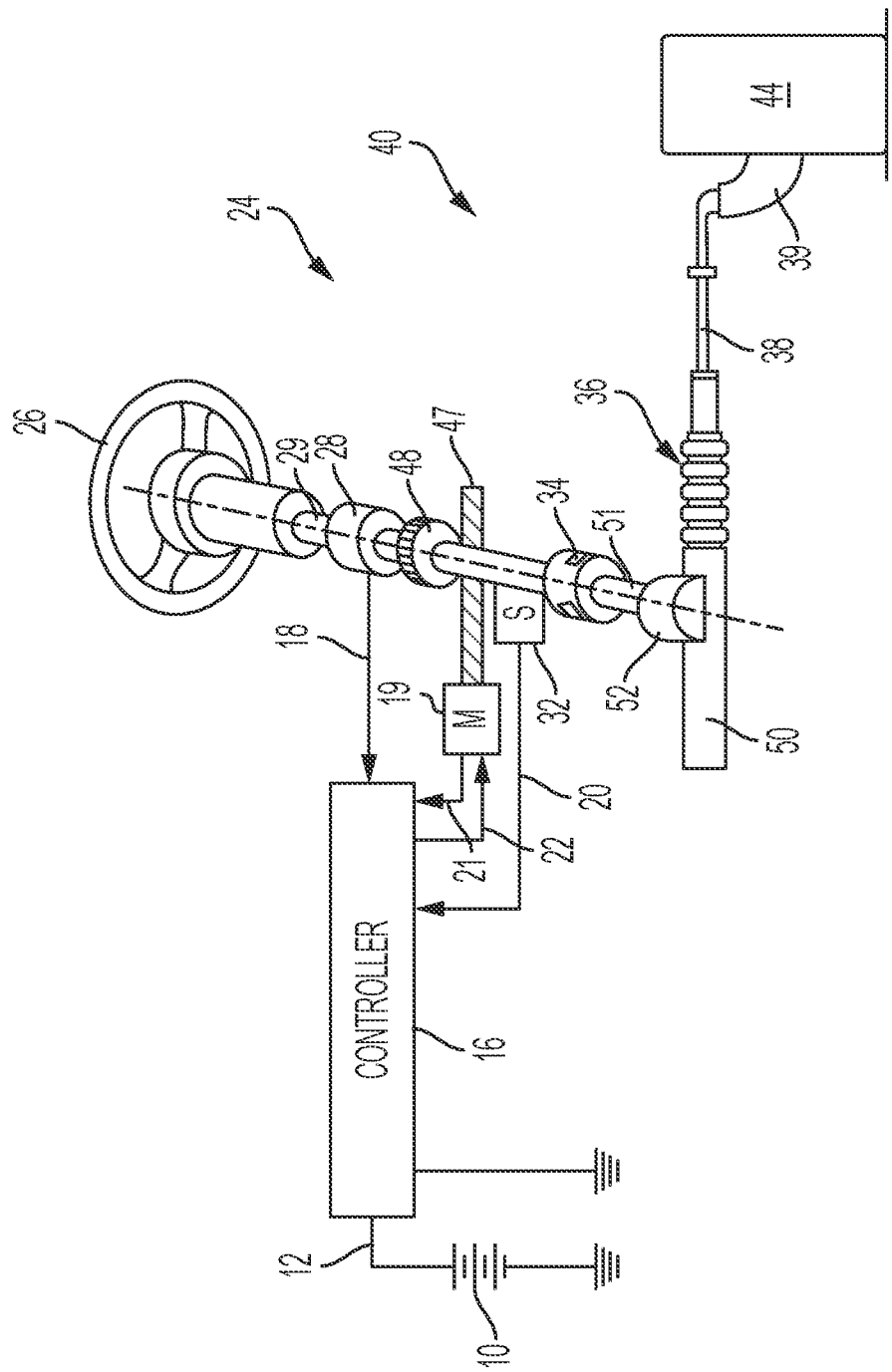
FIG. 1 schematically illustrates an electric power steering (EPS) system for a vehicle.

FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel or the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown), in turn moving the steering knuckles 39 (only one shown), which turn steerable wheel(s) 44 (only one shown).

Electric power steering assist is provided through the control apparatus generally designated by reference numeral 24 and includes the controller 16 and an electric machine 19, which could be a permanent magnet synchronous motor, a permanent magnet direct current motor, a switched reluctance motor, or any other type of motor, are is hereinafter denoted as motor 19. The controller 16 is powered by the vehicle power supply 10 through line 12. The controller 16 receives information from sensors relating to various operating conditions and/or inputs of the EPS system 40, examples of which are illustrated and described below.

As the steering wheel 26 is turned, a torque sensor 28 senses the torque applied to the steering wheel 26 by the vehicle operator. The torque sensor 28 may include a torsion bar (not shown) and a variable resistive-type sensor (also not shown), which outputs a variable torque signal 18 to the controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering. A feedback signal 21 is returned to the controller 16 from the electric motor 19.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and the like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the necessary voltage(s) out of inverter (not shown), which may optionally be incorporated with controller 16 and will be referred to herein as controller 16, such that, when applied to the motor 19, the desired torque or position is generated. Because these voltages are related to the position and speed of the motor 19 and the desired torque, the position and/or speed of the rotor and the torque applied by an operator are determined. A position encoder is connected to the steering shaft 51 to detect the angular position. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby that of the motor 19.

While the EPS system 40 is illustrated schematically in FIG. 1, FIGS. 2-9 illustrate various features in greater detail.

Figure 2:
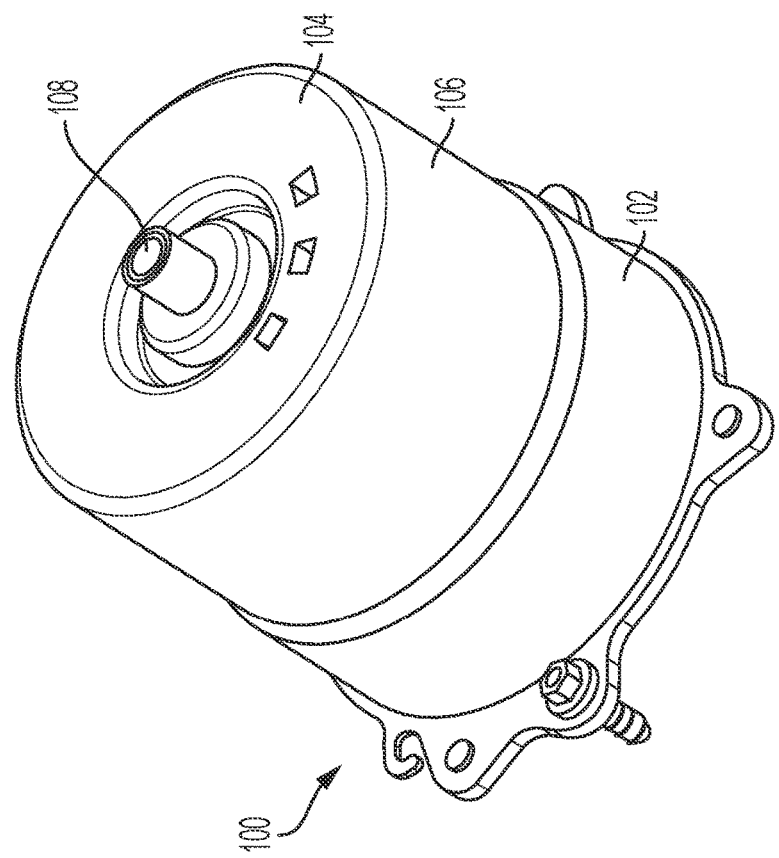
FIG. 2 is a perspective view of a motor housing of the EPS system.

Referring now to FIG. 2, a motor housing 100 is shown. The motor housing 100 surrounds at least a portion of the motor 19. The motor housing 100 may also be referred to as a "motor can". The motor housing 100 is formed of metal and is formed of a substantially cylindrical portion 102 and an end portion 104. The cylindrical portion 102 defines an outer diameter 106 proximate the end portion 104. As shown, a connector 108 extends from the end portion 104 for communication with the controller 16 (also referred to herein as a controller board 16.

Figure 3:
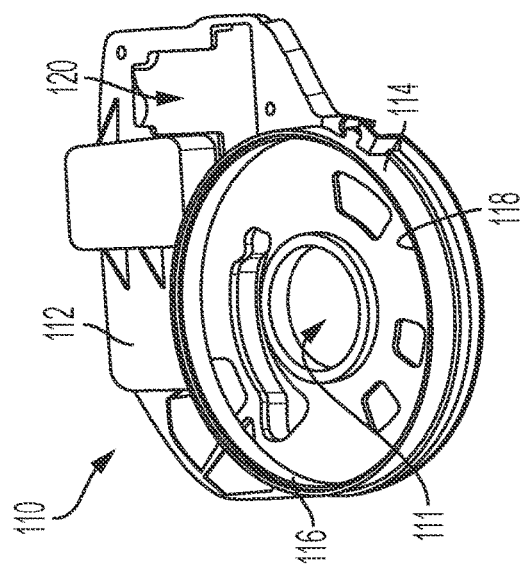
FIG. 3 is a perspective view of a connector plate of the EPS system according to one aspect of the disclosure.

Referring now to FIG. 3, a connector plate 110 is illustrated. The connector plate 110 is provided to couple the motor housing 100 with the controller board 16. The connector plate 110 is formed of a material comprising plastic, such as a composite material, for example. The connector plate 110 defines an aperture 111 that accommodates the connector 108.

In FIG. 3, a first side 112 of the connector plate 110 is predominantly shown. The first side 112 of the connector plate 110 includes a cylinder 114 extending therefrom. A metal ring 116 is disposed on an inner diameter 118 of the cylinder 114. In some embodiments, the metal ring 116 is formed of steel, but other metals are contemplated. The metal ring 116 may be disposed on the inner diameter 118 of the cylinder 114 in any suitable manner. For example, the metal ring 116 may be overmolded to the connector plate 110 in some embodiments. The metal ring 116 extends 360 degrees around the inner diameter 118 of the cylinder 114. The diameter of the inner diameter 118 and the metal ring 116 are configured to facilitate a press fit coupling of the motor housing 100 to the connector plate 110. In particular, the outer diameter 106 of the motor housing 100 is press fit within the metal ring 116 to retain the motor housing 100 and the connector plate 110 together.

The above-described press fit coupling allows the majority of the connector plate 110 to be formed of the plastic material and eliminates the need for reliance on metal mechanical fasteners to make the coupling. Specifically, multiple studs are typically required on the end portion 104 of the motor housing 100 for insertion through holes of the connector plate 110, with multiple nuts required to secure the components.

As shown in FIG. 3, the connector plate 110 defines a hole 120 extending therethrough from the first side 112 to a second side 122. The hole 120 is sized to receive one or more electrical connectors and/or pins therein.

Figure 4:
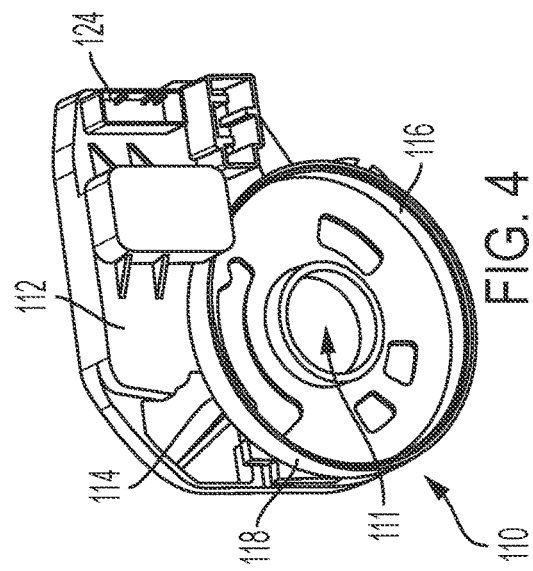
FIG. 4 is a perspective view of the connector plate according to another aspect of the disclosure.

FIG. 4 illustrates an identical connector plate 110 as that shown in FIG. 3, but the first side 112 of the connector plate 110 includes one or more electrical connector pins 124 integrally formed thereon.

Figure 6:
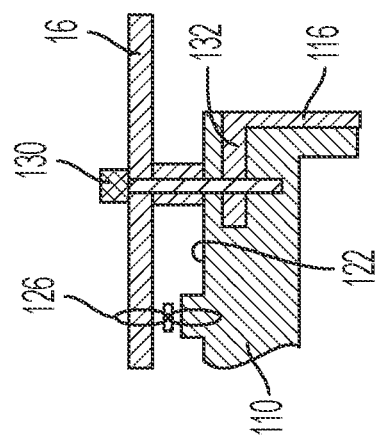
FIG. 6 is an elevational view of a leg of a metal ring.
Figure 5:
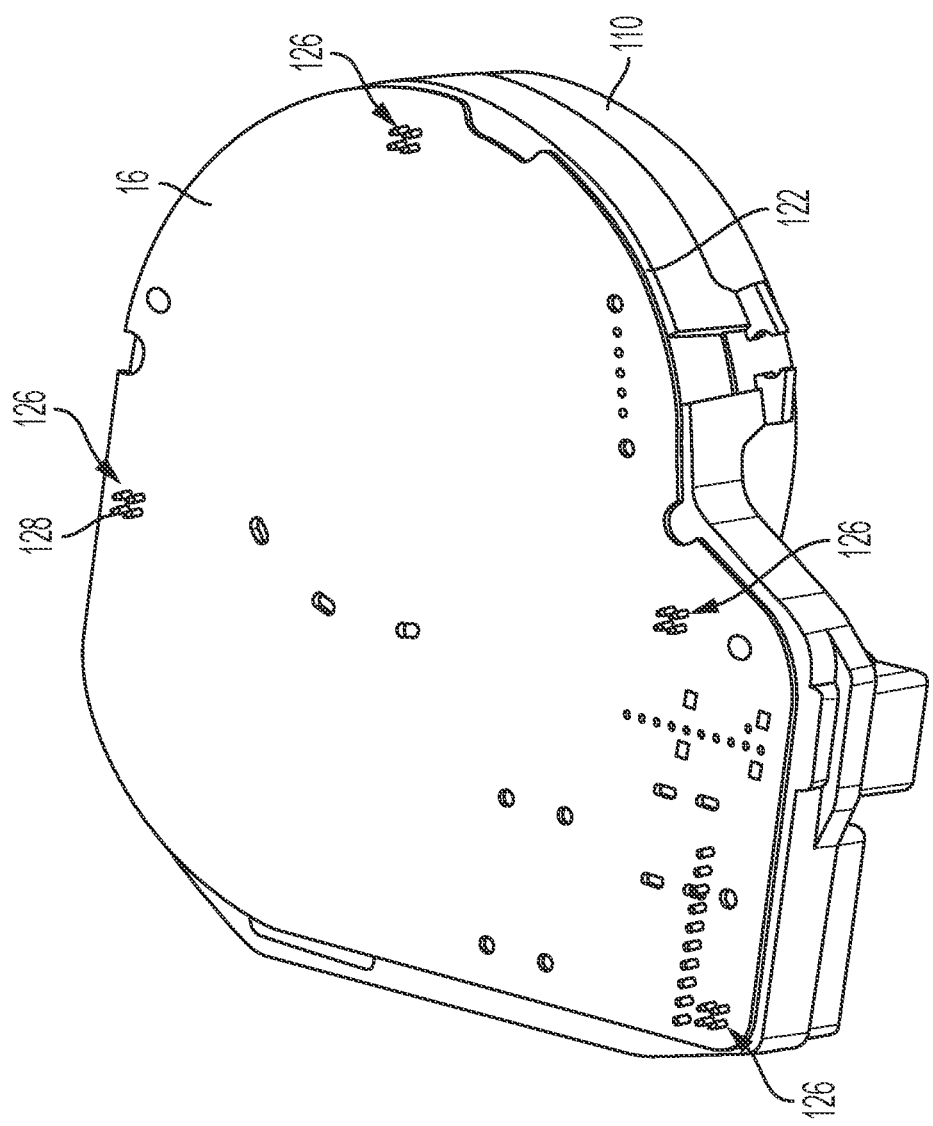
FIG. 5 is a perspective view of a controller board mounted to the connector plate.

Referring now to FIGS. 5 and 6, the controller board 16 is coupled to the second side 122 of the connector plate 110. Coupling of the controller board 16 to the connector plate is made by press fitting a plurality of pins 126 through corresponding apertures 128 defined by the controller board 16. The pins 126 extend from the second side 122 of the connector plate 110 and may be formed of any suitable material. In some embodiments, the pins 126 are formed of a metallic material. The pins 126 are overmolded in the plastic "tray" of the connector plate 110 for mechanical retention of the controller board 16 on the connector plate 110. The number of pins 126 and apertures 128 may vary depending upon the particular application. By way of non-limiting example, FIG. 5 illustrates four clusters of pins numbering four each. The pins 126 are strategically placed to meet coupling demands.

FIG. 6 shows one of the pins 126 press fit to a corresponding aperture 128, as well as a metal pin 130, screw or the like that extends through the controller board 16 and into a portion of the metal ring 116 which is part of the connector plate 110. This metal-to-metal connection electrically grounds the controller board 16.

In some embodiments, the metal ring 116 includes at least one leg 132 extending radially inwardly or radially outwardly, relative to the cylinder 114 of the connector plate 110. The leg 132—or legs where more than one is present—is strategically placed around the circumference of the metal ring 116. Alternatively, the leg 132 may extend a full 360 degrees around the metal ring 116.

Figure 7:
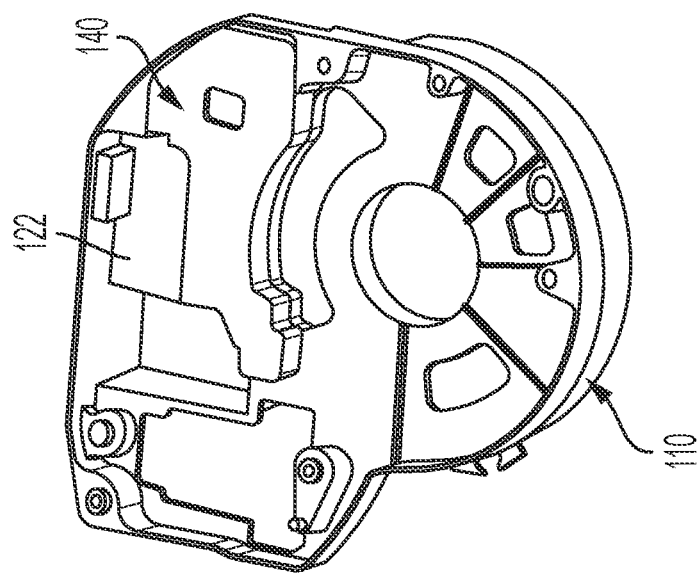
FIG. 7 is a perspective view of a heat sink block on the connector plate of FIG. 3.

Referring now to FIG. 7, the second side 122 of the connector plate 110 is shown with the controller board 16 removed to better illustrate the surface of the second side 122, as well as a metal heat sink 140 disposed on the second side 122 of the connector plate 110. In some embodiments, the metal heat sink 140 is overmolded to the second side 122 of the connector plate 110, but operative coupling thereto is also contemplated.

Figure 9:
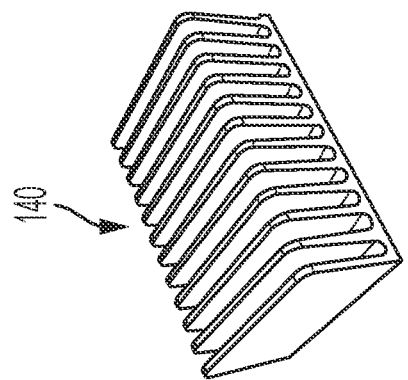
FIG. 9 is a perspective view of an extruded heat sink block.
Figure 8:
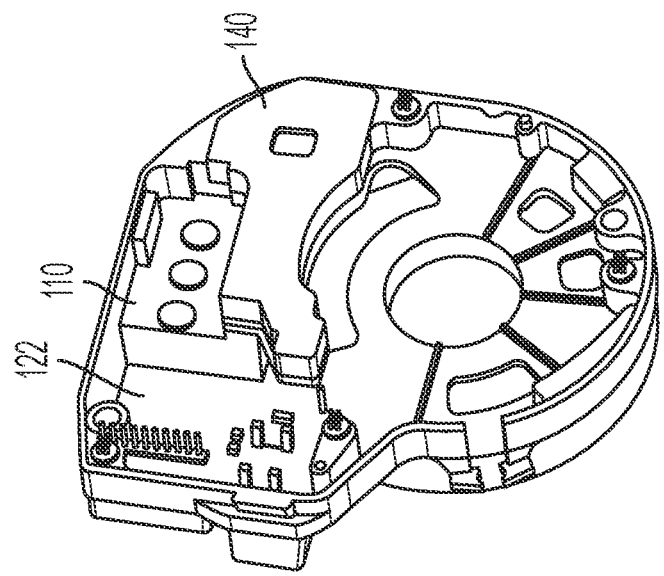
FIG. 8 is a perspective view of the heat sink block on the connector plate of FIG. 4.

FIG. 7 shows the metal heat sink 140 disposed on the second side 122 of the connector plate 110 embodiment of FIG. 3 and FIG. 8 illustrates the metal heat sink 140 used with the connector plate 110 embodiment of FIG. 4. In either embodiment, the metal heat sink 140 may include a plurality of extruded fins 142, as shown in FIG. 9 with an example heat sink.

The embodiments disclosed herein provides a non-metallic connector plate 110 that facilitates mechanical retention between the motor housing 100, the connector plate 110, and the controller board 16. This dramatically reduces the number of metal mechanical fasteners required, as only one metal fastener (i.e., metal pin 130 for grounding) is utilized, thereby reducing manufacturing, shipping and assembly complexity.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A manual power pack assembly for an electric power steering (EPS) system, the manual power pack assembly comprising:

a motor housing at least partially enclosing a motor and having an outer diameter;

a connector plate formed of a material comprising plastic, the connector plate having a first side, a second side, and a cylinder extending from the first side; and a metal ring disposed on an inner diameter of the cylinder and in contact with the outer diameter of the motor housing.

2. The manual power pack assembly of claim 1, wherein the motor housing is press fit to the connector plate based on relative sizing of the outer diameter of the motor housing and the metal ring.

3. The manual power pack assembly of claim 1, wherein the metal ring extends 360 degrees around the inner diameter of the cylinder.

4. The manual power pack assembly of claim 1, wherein the metal ring is overmolded to the cylinder of the connector plate.

5. The manual power pack assembly of claim 1, wherein the connector plate defines a hole extending therethrough from the first side to the second side, the hole configured to receive one or more electrical connectors and/or pins.

6. The manual power pack assembly of claim 1, wherein the first side of the connector plate includes one or more electrical connector pins integrally formed thereon.

7. The manual power pack assembly of claim 1, further comprising a metal heat sink disposed on the second side of the connector plate.

8. The manual power pack assembly of claim 7, wherein the metal heat sink comprises a plurality of extruded fins.

9. The manual power pack assembly of claim 7, wherein the metal heat sink is overmolded to the second side of the connector plate.

10. The manual power pack assembly of claim 1, further comprising a controller board press fit to the second side of the connector plate with a plurality of pins extending from the connector plate away from the second side.

11. The manual power pack assembly of claim 10, wherein the metal ring includes at least one leg extending radially inwardly or radially outwardly, relative to the cylinder, the controller board electrically grounded with a metal mechanical fastener coupled to the controller board and the at least one leg of the metal ring.

* * * * *